(12) United States Patent
Apperson

(10) Patent No.: US 11,015,755 B1
(45) Date of Patent: May 25, 2021

(54) SEWAGE LINE PLUG ASSEMBLY

(71) Applicant: Kevin Apperson, Manassas, VA (US)

(72) Inventor: Kevin Apperson, Manassas, VA (US)

(*) Notice: Subject to any disclaimer, the term of this patent is extended or adjusted under 35 U.S.C. 154(b) by 1 day.

(21) Appl. No.: 16/537,713

(22) Filed: Aug. 12, 2019

(51) Int. Cl.
| | |
|---|---|
| *G08B 21/00* | (2006.01) |
| *F16L 55/11* | (2006.01) |
| *G08B 21/18* | (2006.01) |
| *G08B 3/10* | (2006.01) |
| *G01V 3/02* | (2006.01) |

(52) U.S. Cl.
CPC ............ *F16L 55/11* (2013.01); *G01V 3/02* (2013.01); *G08B 3/10* (2013.01); *G08B 21/182* (2013.01)

(58) Field of Classification Search
CPC ......... F16L 55/11; G08B 3/10; G08B 21/182; G01V 3/02
USPC ........................................................ 340/626
See application file for complete search history.

(56) References Cited

U.S. PATENT DOCUMENTS

| | | | | |
|---|---|---|---|---|
| 2,267,541 A | * | 12/1941 | Van Houten | G01K 3/12 337/317 |
| 4,922,234 A | | 5/1990 | Murphy | |
| 5,349,864 A | * | 9/1994 | Park | G01L 9/12 340/626 |
| 7,245,226 B1 | * | 7/2007 | Thanhauser | G08B 3/10 340/331 |
| 2012/0127103 A1 | * | 5/2012 | Qualey | A61B 5/7445 345/173 |
| 2017/0306608 A1 | * | 10/2017 | Goldberg | G01F 23/164 |

* cited by examiner

*Primary Examiner* — Mark S Rushing
(74) *Attorney, Agent, or Firm* — Sanchelima & Associates, P.A.; Christian Sanchelima; Alexander Rodriguez

(57) ABSTRACT

A sewage line plug assembly is disclosed herein. The assembly comprises a plug housing having a hollow configuration. Additionally, a diaphragm plate is disposed within the plug housing including a first element disposed on the first operative end of the diaphragm plate. Furthermore, first element is configured to depress due to pressure acting thereon due to sewage build up inside a sewage line. The housing further includes a second element disposed on the inner bottom end of the housing. Additionally, the second element interacts with the first element and is configured to depress due to depression of first element. Sewage line plug assembly further includes an alarm unit coupled to second element and configured to sound an alarm on depression of second element. The alarm sound of the alarm unit is configured to sound when the pressure exceeds a predetermined threshold value.

9 Claims, 6 Drawing Sheets

SEWAGE LINE PLUG ASSEMBLY

I. BACKGROUND OF THE INVENTION

1. Field of the Invention

The present invention relates to the field of plugs. In particular, the present invention relates to a sewage line plug that can alert the user of any sewage build up within the sewage line.

2. Description of the Related Art

Several designs for sewage line plugs have been designed in the past. None of them, however, are known to have a sewage pipe alarm comprising a conventional sewage pipe having an electronic measurement device that registers the state of fluid within the pipe and an audible alarm device mounted externally to the pipe, wherein the alarm is activated by a switching mechanism housed within the pipe body. The switch comprises a rubber disk with a metallic contact in the center that is mounted over an aperture within the interior of a threaded cylindrical pipe fitting. When the rubber disk is displaced by fluid within the pipe the contact connects electrically to a circuit that activates the alarm device. The present invention comprises of a simple configuration, which makes it easy for manufacturing, easy to operate to the user, and provides a feedback to the user of any sewage build up within the sewage line using a mechanism having a very low number of elements, and as such, having a substantially fool proof operation.

Applicant believes that a related reference corresponds to U.S. Pat. No. 4,922,234 filed by PAUL J. MURPHY. The Murphy reference discloses an elongated hollow body provided with a mid-length transverse partition and one end of the body is mountable from a sewer pipe in lieu of a cleanout plug thereof and contains a buoyant mercury switch tethered to the partition through the utilization of thin, flexible and relatively insulated conductors passing through the partition in fluid tight sealed engagement therewith and electrically connected to spaced contacts within the mercury switch. However, the device disclosed in the Murphy reference has a large number of elements and, as such, is expensive to manufacture while at the same time being susceptible to frequent failure due to the large number of components. The present invention addresses these issues by providing a mechanism having a low number of elements that is effortless to operate and does not include harmful chemicals such as mercury.

Other documents describing the closest subject matter provide for a number of more or less complicated features that fail to solve the problem in an efficient and economical way. None of these patents suggest the novel features of the present invention.

II. SUMMARY OF THE INVENTION

It is an object of the present invention to provide a sewage line plug assembly having simple configuration, which makes it easy for manufacturing, and easy to operate to the user.

It is another object of the present invention to provide a sewage line plug assembly that provides a feedback in the form of an alarm or a cell phone notification to the user of any sewage build up within the sewage line using a mechanism having a very low number of elements.

It is another object of the present invention to provide a sewage line plug assembly that has a substantially effortless operation.

Further objects of the invention will be brought out in the following part of the specification, wherein detailed description is for the purpose of fully disclosing the invention without placing any limitations thereon.

III. BRIEF DESCRIPTION OF THE DRAWING

With the above and other related objects in view, the invention consists in the details of construction and combination of parts as will be more fully understood from the following description, when read in conjunction with the accompanying drawings in which:

FIG. 1 illustrates an isometric view of a sewage line plug assembly 10, in accordance with an embodiment of the present invention depicted as having a plug housing 12, a diaphragm plate 14 disposed on plug housing 12;

Figure 1:
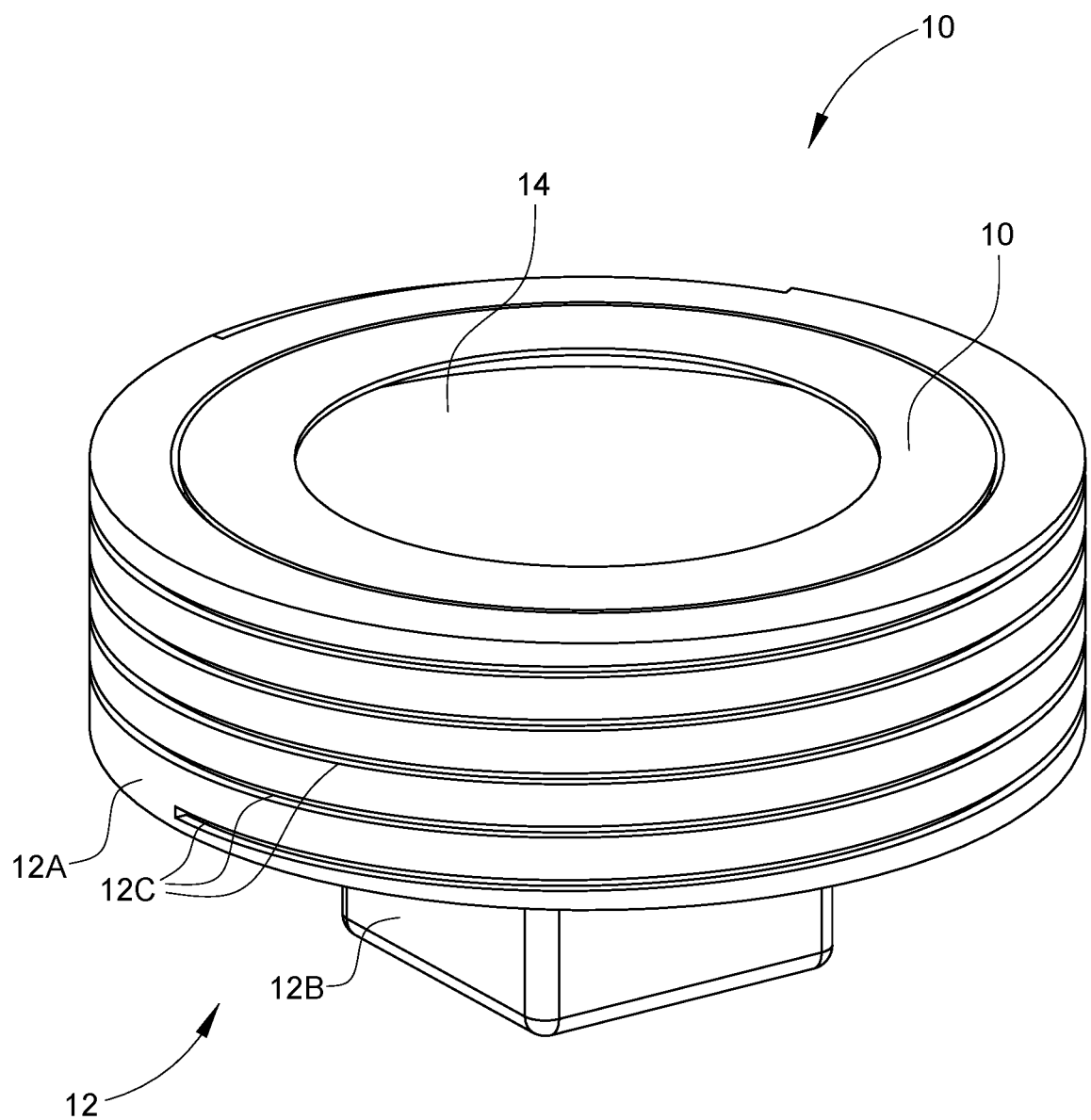
Figure 2:
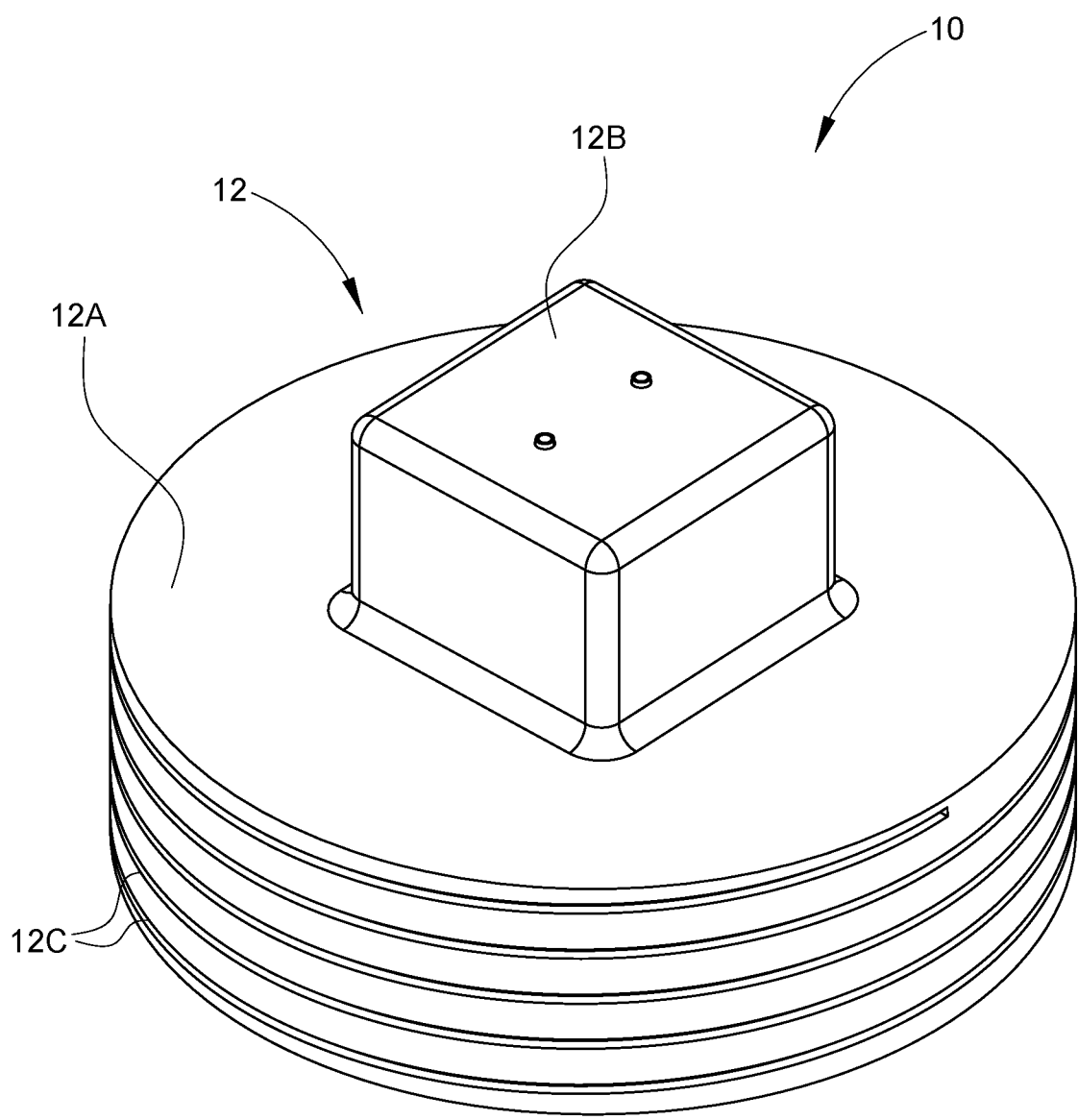
FIG. 2 illustrates a bottom isometric view of sewage line plug assembly 10, in accordance with an embodiment of the present invention.
Figure 3:
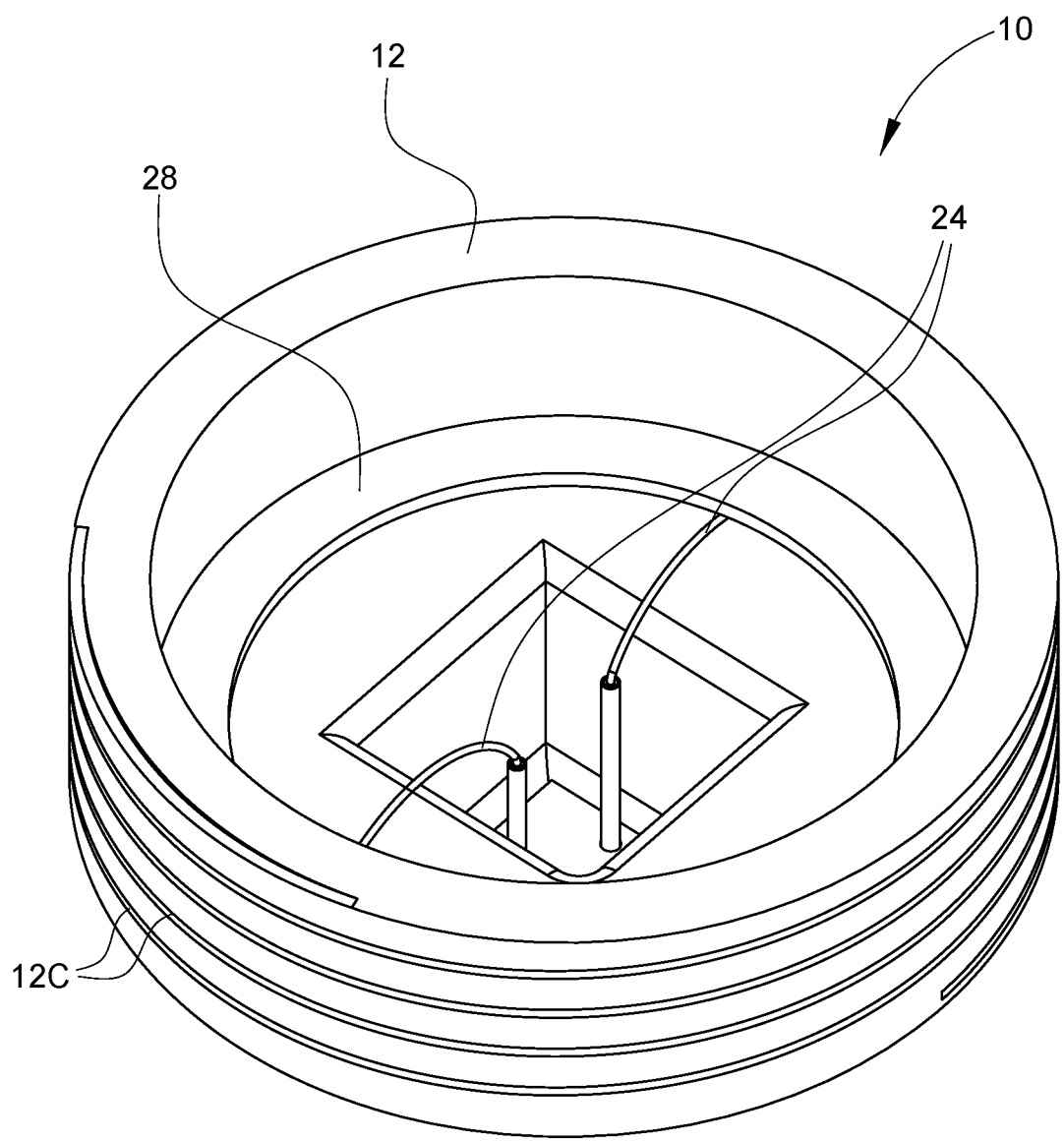
FIG. 3 illustrates an isometric interior view of sewage line plug assembly 10, in accordance with an embodiment of the present invention, wherein lead lines are depicted as being configured within plug housing 12.
Figure 4:
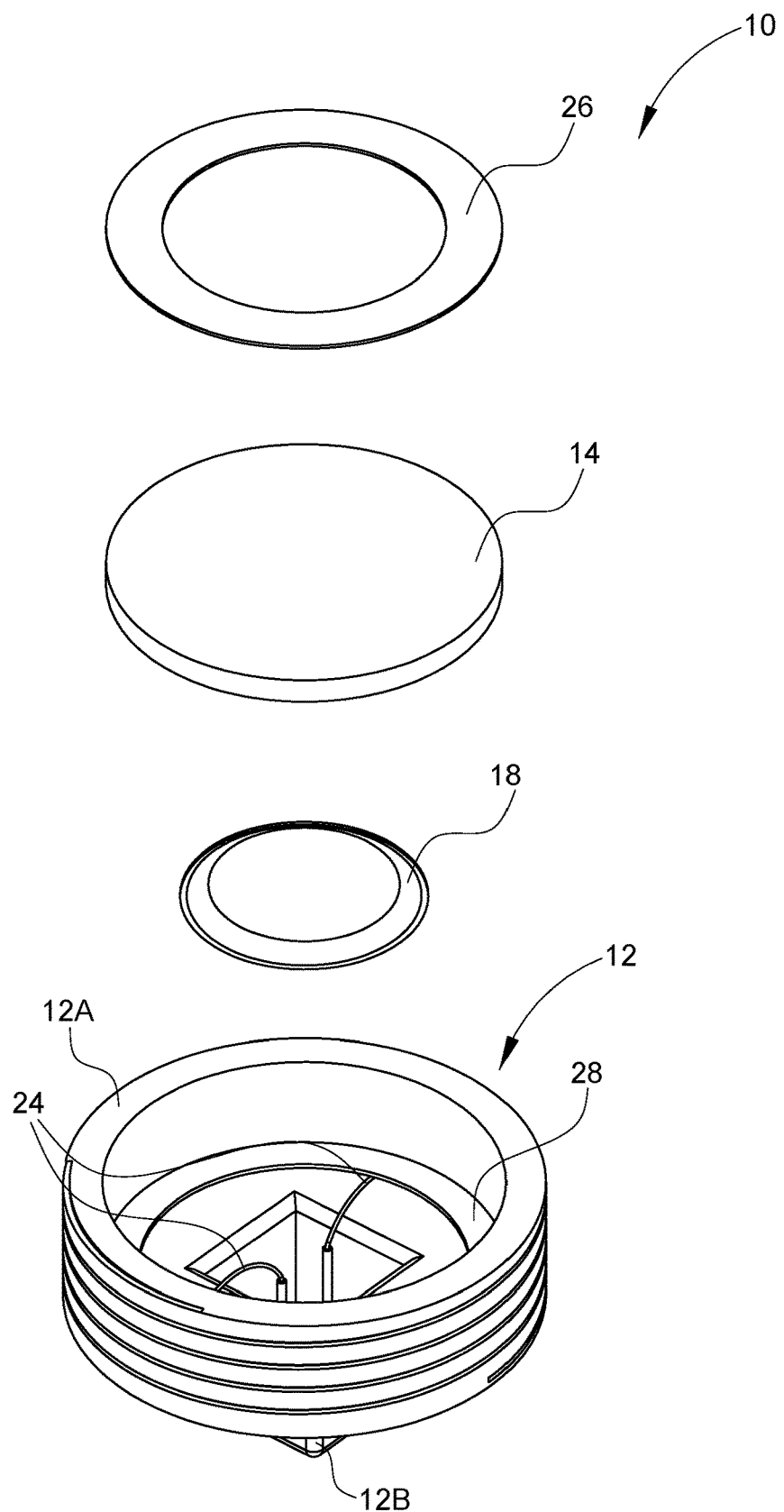
FIG. 4 illustrates an exploded isometric view of sewage line plug assembly 10, in accordance with an embodiment of the present invention.
Figure 5:
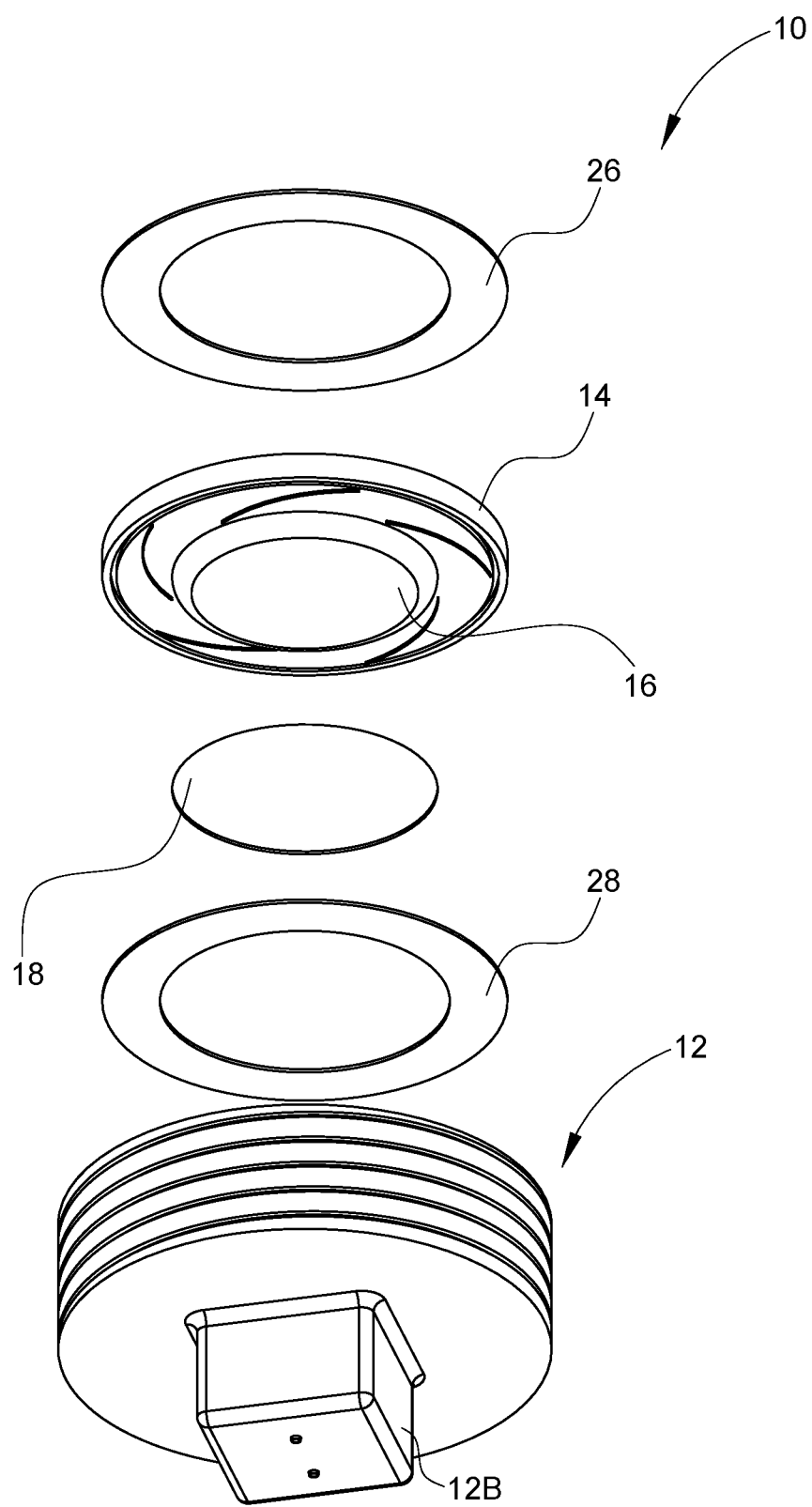
Figure 6:
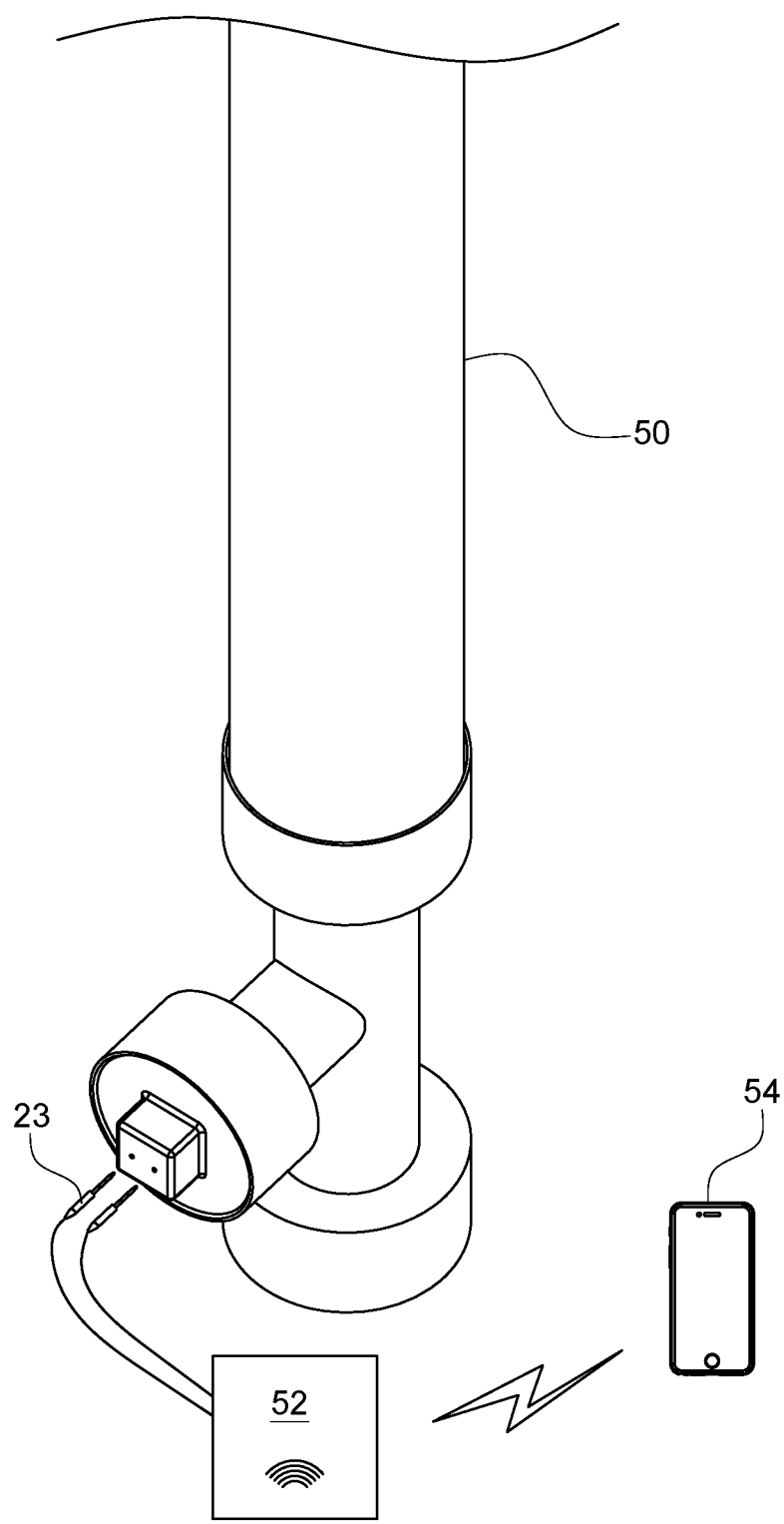

FIG. 5 illustrates another exploded isometric view of sewage line plug assembly 10, in accordance with an embodiment of the present invention; and FIG. 6 illustrates an isometric view of sewage line plug assembly 10 being assembled onto a sewage line 50, in accordance with an embodiment of the present invention.

IV. DETAILED DESCRIPTION OF THE EMBODIMENTS OF THE INVENTION

Referring now to FIGS. 1-6, where the present invention is generally referred to with numeral 10, it can be observed that a sewage line plug assembly 10 (hereinafter referred to as assembly 10), in accordance with an embodiment of the present invention, comprises a plug housing 12, a diaphragm plate 14 disposed within plug housing 12, a first element 16 disposed on a bottom operative end of diaphragm plate 14, a second element 18 disposed within plug housing 12, and an alarm unit 20.

Assembly 10 comprises plug housing 12. Plug housing 12 is the component of assembly 10 that facilitates the fitment of assembly 10 onto a sewage line 50. In accordance with an embodiment of the present invention, plug housing 12 comprises a cylindrical portion 12A and a protrusion 12B extending from cylindrical portion 12A. In accordance with an embodiment of the present invention, protrusion 12B has a square profile for facilitating rotation of plug housing 12 to assemble plug housing 12 onto sewage line 50 with a tool like a wrench. It is to be noted that the profile of protrusion 12B is not limited to being square and can be any shape that can be rotated using a tool like the wrench. Additionally, protrusion 12B comprises audio input jacks 22 located at the bottom distal end of said protrusion 12B.

Plug housing 12 further comprises engagement formations 12C formed on an outer periphery of cylindrical portion 12A. In accordance with an embodiment of the present invention, engagement formations 12C are thread formations. However, engagement formations 12C are not restricted to being thread formations and can be any formation that can provide fluid tight fitment of plug housing 12 onto sewage line 50.

Assembly 10 comprises diaphragm plate 14. Diaphragm plate 14 has a bottom operative end comprising first element 16. In an operational configuration of assembly 10, when assembly 10 is fitted to sewage line 50, any pressure buildup beyond a pre-determined threshold in sewage line 50 causes first element 16 to be depressed. Assembly 10 further comprises a first ring 26 for facilitating fitment of a top operative end of diaphragm plate 14 onto plug housing 12.

Assembly 10 further comprises second element 18 disposed within plug housing 12. Second element 18, in accordance with an embodiment of the present invention, is a metallic plate. Second element 18 and first element 16 are configured in a manner that the depression of first element 16 is either partially or totally transmitted to second element 18, thereby making contact and completing the circuit to trigger the alarm. Additionally, assembly 10 comprises second ring 28 disposed between the bottom operative end of diaphragm plate 14 and plug housing 12. Second ring 28 prevents any contact from first element 16 and second element 18 not caused by pressure buildup.

Assembly 10 further comprises alarm unit 20. Alarm unit 20 is coupled to second element 18. Alarm unit 20 further comprises wire leads 24. In the present embodiment, one of the wires of wire leads 24 is attached to first element 16. Another wire is attached to second element 18. In accordance with an embodiment of the present invention, alarm unit 20 is configured to sound an alarm once the depression of first element 16 exceeds a pre-determined threshold value. When first element 16 is depressed, the metallic nature of first element 16 makes contact with the metallic nature of second element 18 and thereby facilitates the completion of alarm circuit by coining in contact with the leads, which causes the alarm unit 20 to activate.

It is to be noted that the connection between alarm unit 20 and second element 18 is shown to be wired connection in accordance with the embodiment so far described. However, the connection is not limited to being a wired connection and can also be a wireless connection facilitated by conventional battery powered proximity sensors and alarm units. The present embodiment provides audio jacks 23 to be connected to audio jack inputs 23, audio jacks 23 are further attached to a sensor 52. Once alarm unit 20 is activated, a signal is transferred from said alarm unit 20 to sensor 52 through audio jacks 23. Sensor 52 may then activate an alarm to notify a user of the increase in pressure. Additionally, sensor 52 may send a notification to a cellphone 54 to notify a user of the increase in pressure within sewage line 50.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A sewage line plug assembly comprising:
   a. a plug housing having a hollow configuration;
   b. a diaphragm plate disposed within said plug housing;
   c. a first element disposed on a bottom operative end of said diaphragm plate, said first element configured to depress because of pressure acting thereon due to sewage build up inside a sewage line;
   d. a second element disposed within said plug housing, said second element interacting with said first element and configured to contact first element because of pressure acting thereon due to sewage build up, said sewage line plug assembly further including a first ring and a second ring, wherein said second element is concentrically disposed within said second ring located entirely within said housing, wherein said second ring is a flat circular ring having a circumference in abutting engagement with interior walls of said housing, wherein said second element includes a diameter being less than a diameter of said second ring, said second element protruding upwardly when inserted within said housing, wherein said first element is concentrically disposed on said bottom operative end of said diaphragm plate and having a diameter less than a diameter of said diaphragm plate, said first element inserted within said housing and being in contact with said second ring, wherein said first element protrudes downwardly when inserted within said housing and being spaced apart from said second element, wherein said first ring is a flat circular ring with an opening along a center, wherein said first ring is positioned flush with a top end of housing, wherein said opening exposes an operative top end of said diaphragm plate when positioned thereon; and
   e. an alarm unit coupled to said plug housing to be attached to a sensor through the use of audio jacks to send a signal to activate an alarm.

2. The assembly according to claim 1 wherein said diaphragm plate is made of a rubber material.

3. The assembly according to claim 1 wherein said first element and said second element is a metallic plate.

4. The assembly according to claim 1 wherein said alarm unit is attached to said sensor through audio jack inputs located on a bottom distal end of said plug housing.

5. The assembly according to claim 1 further comprising wire leads for facilitating connection of said alarm unit with said first element and said second element.

6. The assembly according to claim 1 wherein said plug housing comprises a cylindrical portion and a first protrusion extending from said cylindrical portion.

7. The assembly according to claim 1 wherein said plug housing comprises engagement formations configured on an outer periphery of a cylindrical portion for facilitating fitment of said plug housing to said sewage line.

8. The assembly according to claim 7 wherein said engagement formations are thread formations.

9. A sewage line plug assembly consisting of:
   a. a plug housing having a hollow configuration, said plug housing comprising a cylindrical portion, a protrusion extending from said cylindrical portion and engagement formations configured on an outer periphery of said cylindrical portion for facilitating fitment of said plug housing to a sewage line, wherein said engagement formations are thread formations, said plug housing further comprises audio input jacks on a bottom distal end of said plug housing;
   b. a diaphragm plate disposed within said plug housing wherein said diaphragm plate is made of a rubber material, wherein said diaphragm plate comprises a first ring on the top operative end of said diaphragm plate, said diaphragm plate further includes a second ring disposed between bottom operative end of said diaphragm plate and the interior of said plug housing, wherein said second ring is a flat circular ring having a circumference in abutting engagement with interior walls of said housing;
   c. a first element disposed on a bottom operative end of said diaphragm plate, wherein said first element is a metallic plate, said first element configured to depress because of pressure acting thereon due to sewage build up inside said sewage line;

d. a second element disposed within said plug assembly, wherein said second element is a metallic plate, said second element interacting with said first element and configured to depress due to said depression of said first element, wherein said second element is concentrically disposed within said second ring located entirely within said housing, wherein said second element includes a diameter being less than a diameter of said second ring, said second element protruding upwardly when inserted within said housing, wherein said first element is concentrically disposed on said bottom operative end of said diaphragm plate and having a diameter less than a diameter of said diaphragm plate, said first element inserted within said housing and being in contact with said second ring, wherein said first element protrudes downwardly when inserted within said housing and being spaced apart from said second element, wherein said first ring is a flat circular ring with an opening along a center, wherein said first ring is positioned flush with a top end of housing, wherein said opening exposes an operative top end of said diaphragm plate when positioned thereon;

e. an alarm unit coupled to said plug housing and connected to a sensor through the use of audio jacks, wherein once the threshold pressure is exceeded said sensor will sound an alarm and provide a notification to a cellphone; and f. wire leads for facilitating connection of said alarm unit, wherein said leads are connected to said first element and said second element.

* * * * *